INVENTORS
WILLIAM E. SWENSON
WALTER F. RUHLAND
BY VICTOR N. ALBERTSON

Carlsen and Carlsen
ATTORNEYS

Jan. 5, 1965  W. E. SWENSON ETAL  3,164,199
TIRE CHANGER

Filed Sept. 26, 1961  4 Sheets-Sheet 3

INVENTORS
WILLIAM E. SWENSON
WALTER F. RUHLAND
BY VICTOR N. ALBERTSON

Carlsen and Carlsen
ATTORNEYS

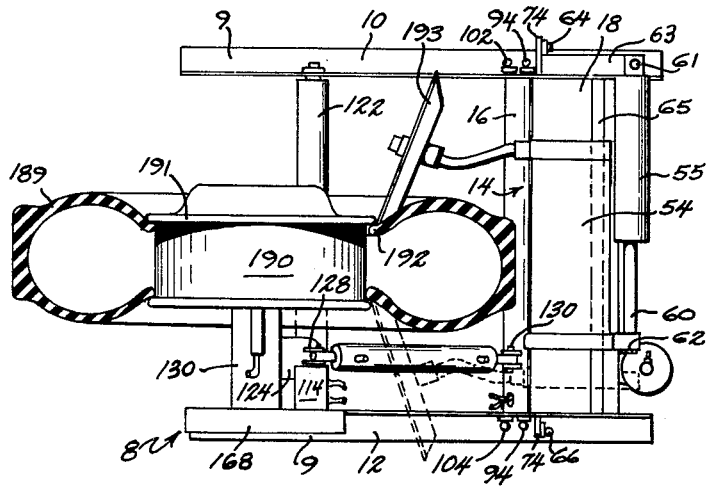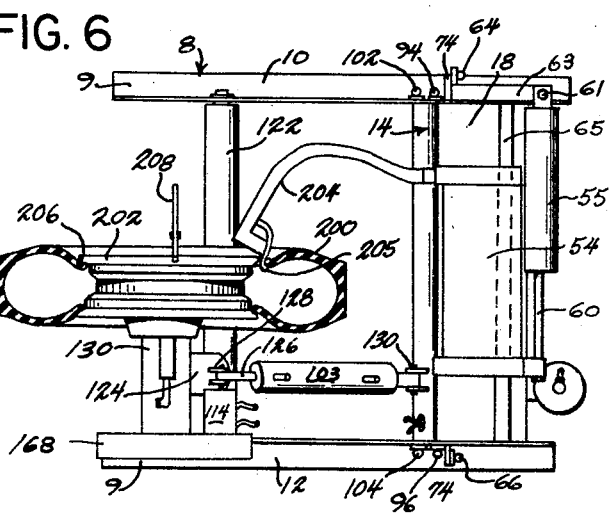

United States Patent Office 3,164,199
Patented Jan. 5, 1965

3,164,199
TIRE CHANGER
William E. Swenson, St. Paul, Walter F. Ruhland, Shakopee, and Victor N. Albertson, St. Louis Park, Minn., assignors to Bishman Manufacturing Company, Osseo, Minn., a corporation of Minnesota
Filed Sept. 26, 1961, Ser. No. 140,915
2 Claims. (Cl. 157—1.24)

The present invention relates to tire repair equipment and more particularly to an apparatus commonly referred to as a tire changer used for mounting and demounting vehicle tire casings from a rim or wheel.

A variety of devices have been proposed in recent years for mounting and demounting tires semi-automatically. As a result, semi-automatic tire changing equipment is now in wide spread use. Heretofore, the apparatus used for performing this work has been in most instances unsatisfactory for relatively large tires such as truck tires and the like. Such tires, because of their large size are difficult to handle manually and, for this reason, tire changing equipment which requires that the tire be lifted from the floor to be placed in the operating position on the apparatus has been in general considered unsatisfactory.

In view of the shortcomings of the prior art, it is one object of the present invention to provide a tire changer which is well suited for changing relatively large tires and is particularly well adapted for changing truck tires utilizing split rim wheels.

It is another object of this invention to provide an improved tire changer which is well suited for heavy work but it nevertheless compact and relatively simple in construction.

It is yet another object of this invention to provide an improved tire changer which utilizes a single drive means for both securing the wheel in place on its support and also for breaking the bead of the tire away from the tire rim.

It is a still further object of the present invention to provide an improved tire changer which is well suited for relatively heavy work including the repair of large truck tires wherein the tire need not be lifted from the floor manualy to place it in position on the apparatus.

It is still another object of this invention to provide an improved tire changer which utilizes a single drive means for both lifting the tire out of contact with the floor and also for positioning the tire with respect to a tire tool affixed to the apparatus.

It is yet another object of the present invention to provide an improved tire changer wherein a single tool support means can be used to support tools for work on both sides of the tire.

It is yet another object of this invention to provide an improved tire changer including means for enabling the apparatus to be controlled by an operator standing on either side thereof.

Briefly stated, there is provided in a preferred form of this invention a frame with a generally upwardly extending boom pivotally mounted thereon for movement about a horizontal axis. A wheel chuck is rotatably mounted at the free end of the boom and a driving means is provided to rotate the wheel chuck. A driving means is also provided to pivot the boom and a tool support means on the frame is adapted to carry a tire tool for mounting and demounting the tire when the tire is rotated.

The wheel chuck preferably includes an axially movable spindle and a plurality of radially extending slidable wheel engaging members. The inner ends of the wheel engaging members are operatively associated with the spindle to move radially as the spindle is moved axially on the chuck. A drive means is provided for sliding the spindle axially of the chuck thereby causing the wheel engaging members to move outwardly into engagement with the wheel rim to retain the wheel securely on the chuck.

The tool support means is preferably laterally slidable on the frame and is adapted to carry a tire tool at both ends, one such tool being provided for operating on each side of a tire. While in a preferred form of the invention, the boom chuck and tool support are operated by hydraulic drive means, it will be apparent to those skilled in the art that other suitable drive means can be used, if desired.

These and other more detailed and specific objects will be disclosed in the course of the following specification, reference being had to the accompanying drawings, in which—

FIG. 5 is a plan view of the apparatus during operation upon a truck tire.

FIG. 6 is a view similar to FIG. 5 with a passenger tire in the operating position.

Figure 1:
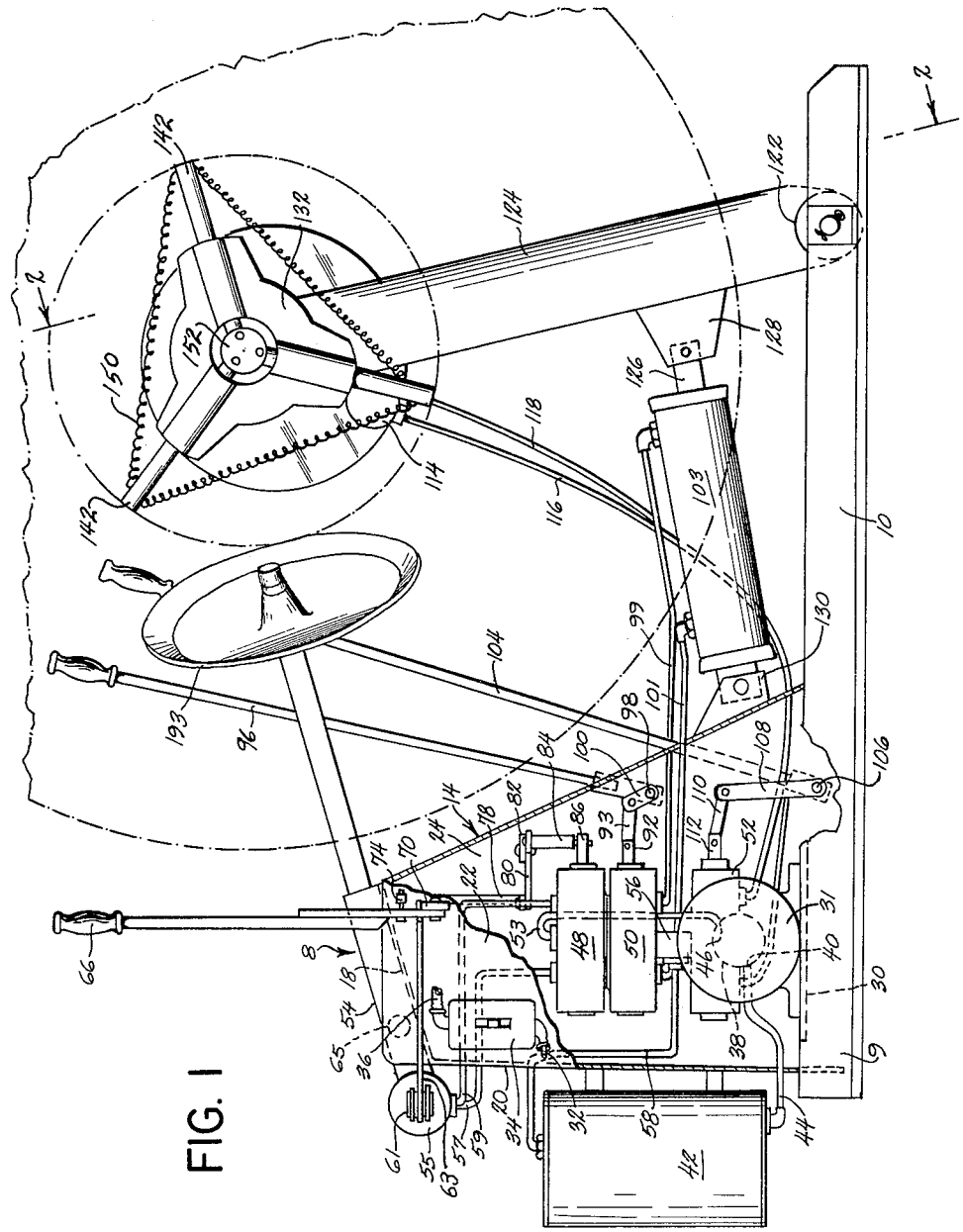
FIG. 1 is a side elevational view partly broken away of one form of this invention.

Referring now to the drawings and particularly to FIG. 1, there is shown a tire changer 8 according to this invention including a frame 9 comprising a pair of parallel horizontally disposed frame members such as angle irons 10 and 12 and a housing 14. The members 10 and 12 support the apparatus from the floor. When the apparatus is to be permanently installed, it is preferred that these members be affixed to the floor by a suitable fastening means such as bolts (not shown). The housing 14 is secured between the ends of the frame members 10 and 12. This housing contains a drive motor, a source of hydraulic fluid under pressure such as a hydraulic pump and also by hydraulic valves, all of which will be fully described hereinbelow.

The housing 14 includes an inclined front wall 16, an inclined upper wall 18, a rear wall 20 and a pair of vertical side walls 22 and 24. These walls are preferably formed from relatively heavy sheet metal and serve both as an enclosure for the motor and valves and also as a structural supporting frame work. These side walls can be secured to each other by any suitable means such as welding.

Secured between the members 10 and 12 within the housing 14 is a a horizontally disposed mounting plate 30. Fastened to the upper side of this plate is an electric motor 31 which has current supplied to it through a conductor 32 connected to a switch box 34. The switch box in turn is connected to the motor 31 by conductors contained within the conduit 36, only a part of which is shown in FIG. 1.

Connected to the shaft of motor 31 is a hydraulic pump 38 of any suitable known construction. The pump 38 includes an inlet 40 communicating through a conduit 44 with a hydraulic fluid reservoir 42 which is suitably attached to the rear wall 20 of the enclosure 14. The pump 38 includes an outlet 46 which communicates with the valves 48, 50 and 52 through conduit 53.

While any suitable hydraulic valves can be used, double-acting open center spool valves of known construction are preferred. The open center communicates between valves 50 and 52 through a conduit 56. Fluid within conduit 56 is exhausted to the reservoir 42 through a conduit 58. Thus when none of the valves 48, 50 and 52 is actuated, hydraulic fluid will be drawn from the reservoir 42 through line 44, through the pump 38, and through conduit 53 into valves 48, 50 and 52 and then from the conduit 56 to supply reservoir 42 through the conduit 58.

The valve 48 controls a suitable actuator means for positioning a tool carriage 54 which is slidably mounted for movement along a horizontal path across the top of the housing 14. The actuator preferably comprises a horizontally disposed hydraulic cylinder 55. A cylinder support bracket 63 is welded to the side wall 22 of the housing 14 and the cylinder 55 is secured to bracket 63 by a vertically disposed pivot pin 61. The cylinder 55 includes movable actuator element 60, best seen in FIGS. 5 and 6, the free end of which is secured to the carriage 54 by a suitable fastener means such as bolt 62. Connected between the valve 48 and the actuator cylinder 56 are a pair of conduits 57 and 59 to convey hydraulic fluid under pressure from the valve 48 to either side of the movable actuator element 60 as required to move the carriage 54 in the desired direction across the top of housing 14.

The control valve 48 is operated by either one of a pair of connected control levers 64 and 66. The levers 64 and 66 are pivotally mounted at their lower ends upon brackets 70 and 72 respectively for movement about a horizontal axis with the free end of each of the levers moving laterally of the apparatus parallel to the direction of travel of the carriage 54. Pivotally attached at opposite ends to the levers 64 and 66 is a horizontally disposed connecting link 74 which passes through the housing 14 and extends outwardly through suitable openings in the side walls 22 and 24 to cause the control levers 66 and 64 to move together as a unit. As a result, operation of the valve 48 can be controlled by either of the levers 64 or 66 depending upon which side of the apparatus the operator finds it convenient to stand for best observation of the tire mounting or removal operation.

As can be seen in FIG. 1, rigidly connected to the link 74 within housing 14 and extending downwardly therefrom is a rod 78. The lower end of rod 78 is pivotally connected to one arm of a horizontally disposed bell crank 80 which is pivotally mounted upon a bracket 82 secured to the side wall 24. Pivotally connected to the other arm of bell crank 80 is a rod 84 which extends downwardly therefrom and is pivotally connected at its lower end to the spool 86 of valve 48. Thus, when the lever 66 is moved, for example, to the right in FIG. 3, the link 74 also moves to the right and carries with it the rod 78 thereby causing the bell crank 80 to pivot clockwise when viewed from above thereby moving the rod 84 and control element 86 to the left in FIG. 1. Movement of either of the control handles 64 or 66 to the left in FIG. 3 will cause the control element 86 to move to the right in FIG. 1.

The tool support carriage 54 is generally rectangular in shape and includes suitable linear bushings (not shown) mounted on a slide rod 65 which is connected between the side walls 22 and 24 of the housing 14 and positioned above the top wall 18. The carriage 54 is provided with a pair of laterally spaced apart tool connecting means such as sockets 67 and 69, best seen in FIG. 3.

The valve 50 is secured to the under surface of valve 38 and includes a movable control element 92. Control element 92 is operated by either of control levers 94 and 96 which are rigidly secured to opposite ends of a horizontally disposed shaft 98 pivotally mounted within the housing 14. Shaft 98 has rigidly secured to it a radially extending link 100 which is pivotally connected to one end of a link 93, the other end of which is secured to control element 92. Movement of either of the levers 94 or 96 to the right in FIG. 1 will move the valve element 92 of valve 50 to the right in FIG. 1.

Pivotally connected at opposite ends of the frame members 12 and 10 for movement about a horizontal axis is a horizontally disposed tubular support member 122. Extending radially upward therefrom and secured thereto by any suitable means such as welding is a chuck supporting boom 124. The boom actuator cylinder 103 is pivotally connected between the frame and the boom 124. A pair of flexible hydraulic lines 99 and 101 connect the cylinder 103 and valve 50.

The actuator cylinder 103 includes a movable actuator element 126 which is pivotally connected between a pair of brackets 128 secured rigidly to boom 124. The housing of the actuator cylinder 103 is pivotally connected between a pair of brackets 130 secured to the wall 16 of the housing 14. During the operation, movement of either of levers 94 and 96 in one direction will cause the movable element 126 of the actuator 103 to be extended thereby moving the boom about the axis of shaft 122 in a clockwise direction as seen in FIG. 1, while movement of either of the control levers 94 and 96 in the opposite direction will cause the movable element 126 to be retracted thereby moving the boom 124 in a counterclockwise direction. The movement of the boom thus enables a tire mounted upon the chuck to be lifted from the floor and also moved toward or away from the carriage 54 as required to accommodate tires of different sizes.

The valve 52 communicates with valve 50 through the conduit 56 and is operated by means of either of levers 102 or 104. These levers are secured rigidly to the opposite ends of a horizontally disposed shaft 106 which is pivotally mounted within the housing 14. Shaft 106 has secured to it a radially extending link 108 the outer end of which is pivotally connected to a link 110, the link 110 being connected at the other end to a movable control element 112 of valve 52. The valve 52 communicates through flexible ducts 116 and 118 with a chuck drive motor 114, described more fully hereinbelow.

Rigidly secured to the free end of the boom 124 is a horizontally disposed tubular chuck support member 130. Mounted on one end of member 130 for rotation about a horizontal axis is a wheel chuck 132. The chuck 132 preferably includes a plurality of radially extending spokes 134, 136 and 138. Each spoke is provided with a radially extending bore 140. Slidably mounted within each of the bores 140 is a rim engaging member 142. Each of members 142 is cylindrical in shape and is provided with a conical inward end surface 144. The outward end of each of members 142 has secured to it a bolt 146 with a grooved head adapted to engage and firmly support the rim 190 of a tire 189.

Adjacent the outward end of each of members 142 is secured a rim stop 148. Entrained around each of the rim stops 148 is a helical spring 150 which has its ends connected to form an endless loop. Spring 150 is provided for the purpose of yieldably biasing the rim engaging members 142 inwardly.

Figure 4:
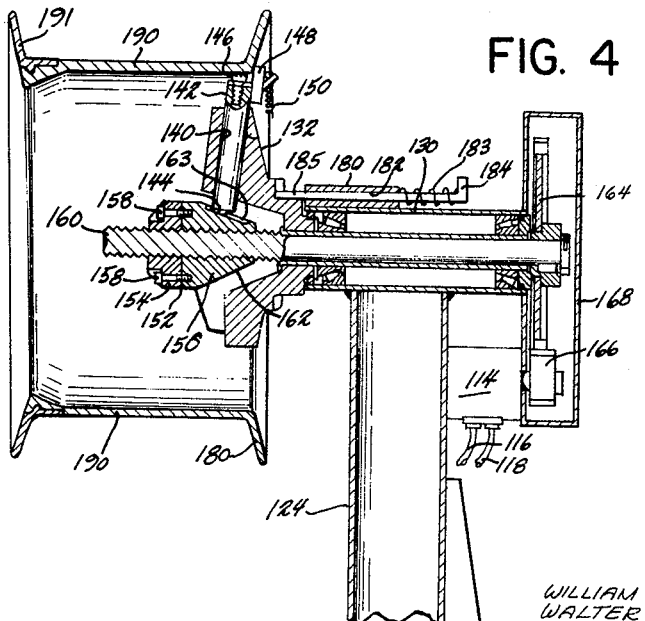
FIG. 4 is a sectional view taken on line 4—4 of FIG. 3.

Operatively associated with the rim engaging members 142 is a spreader member 152 which comprises a pair of members 154 and 156 suitably connected together by bolts 158. The spreader member 152 is screw-threaded onto a chuck drive screw 160 which is mounted for rotation upon a horizontal axis and positioned concentrically within the chuck and support member 130. The member 152 is provided with a frustoconical face 162 having a plurality of longitudinally extending circumferentially spaced apart grooves 163, one such groove being associated with each of members 142. Only one of these grooves is shown in FIG. 4. The grooves 163 receive the inward ends 144 of the rim engaging members 142 and move the latter radially as the spindle moves axially on the chuck drive screw 160.

At the opposite end of the chuck drive screw 160 from the spreader member 152 is secured a spur gear 164 and in driving engagement therewith is a gear 166 secured to the shaft of a reversable hydraulic chuck drive motor 114. Chuck drive motor 114 is supported from a side of a housing 168 secured to tube 130. The housing 168 encloses and serves as a guard for the gears 166 and 164.

Secured rigidly to the upper surface of the chuck support member 130 is a bracket 180 having a bore 182 parallel to the axis of the chuck drive screw 160. Slidably mounted within the bore 182 is a chuck stop pin 184 which is biased yieldably by spring 183 to the right in FIG. 4 away from the chuck 132. The end 185 of the chuck stop pin nearest the chuck 132 is adapted to engage any one of a number of circumferentially spaced apart recesses 186, best seen in FIG. 2, in the face of the chuck nearest the support member 130.

Figure 2:
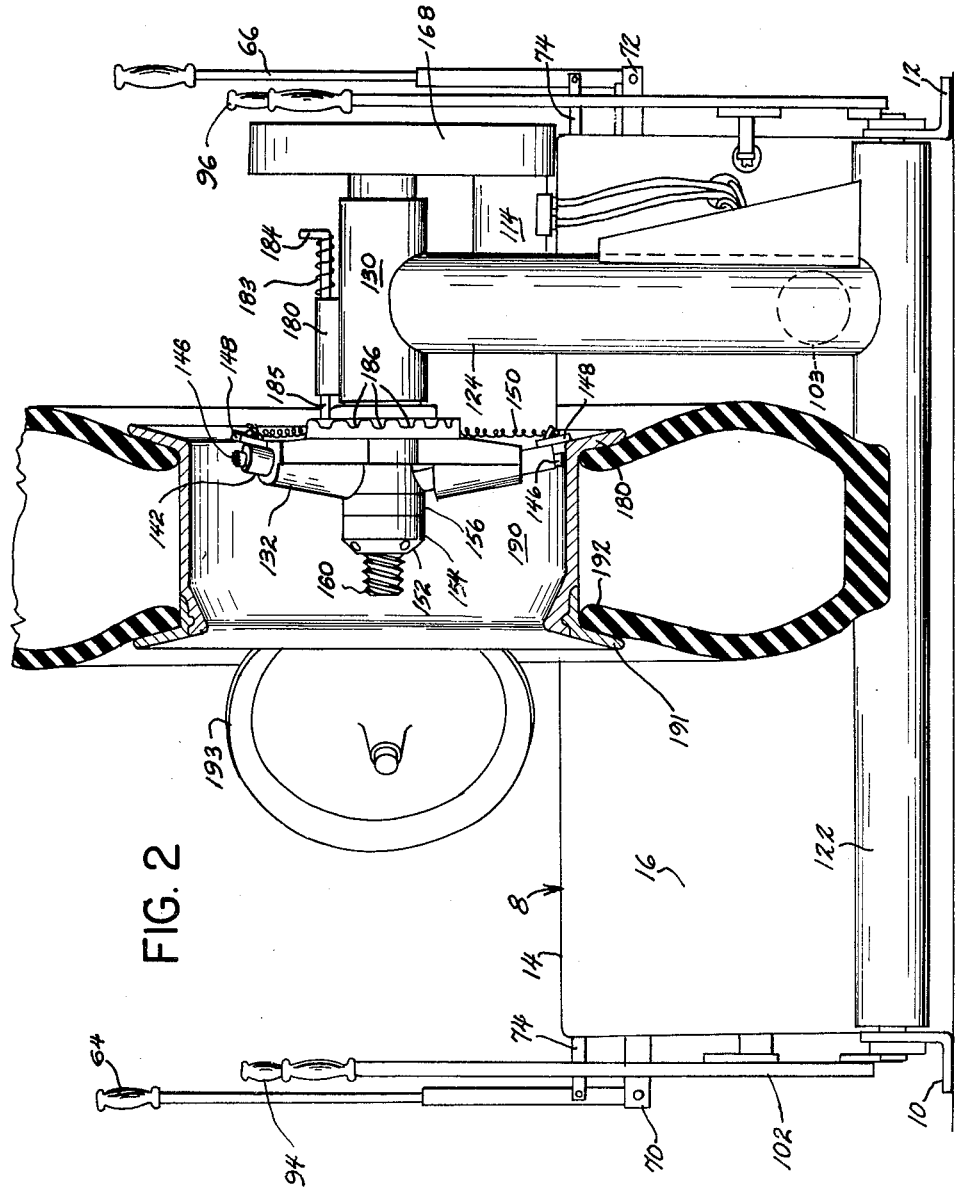
FIG. 2 is a sectional view taken on line 2—2 of FIG. 1.

Thus, in operation, when the drive motor 114 rotates in one direction, rotation of the chuck drive screw 160 will cause the chuck member to move to the right in FIGS. 2 and 4. As the member 152 moves to the right, engagement between the inclined bottom surface of each of grooves 163 and the rim engaging members 142 will drive the rim engaging members 142 outwardly until the free ends 146 thereof engage the inner surface of the rim 190 of tire 189. When the members 142 have engaged the rim, the rim will be securely locked in position on the chuck and further movement of the member 152 with respect to the chuck drive screw and chuck 132 is thus prevented. Since the chuck 132 is free to rotate on the support 130, the drive motor 114 will then cause the chuck 132, rim 190 and tire to rotate as a unit with the chuck drive screw. It is thus apparent that the chuck drive motor 114 serves a dual purpose, namely that of urging the members 142 outwardly into engagement with the rim 190 and also that of rotating the rim, tire and chuck.

Operation

In operation, briefly the tire 189 upon which work is to be performed, is rolled into position parallel with the wheel chuck 132 and is then mounted upon the chuck. The tire engaging members 142 are then moved outwardly to engage the rim 190. The boom is then pivoted upwardly to a position in which a tire tool, such as a wheel press 193 mounted within socket 67, is located adjacent the portion of the tire nearest the rim. The tool carriage 54 is then moved laterally to force the press 193 against the bead 192 of the tire 189. The tire is then caused to rotate thereby breaking the bead 192 away from the rim 190. The wheel press 193 is then moved to the socket 69 on the other side of the tool support carriage 54 and the same operation is then repeated on the other side of the tire. A split rim 191 of the tire 189 can then be removed and the entire tire can be slid off the rim.

In practice, a particular series of operating steps have been found most successful. These steps will now be set forth.

Figure 3:
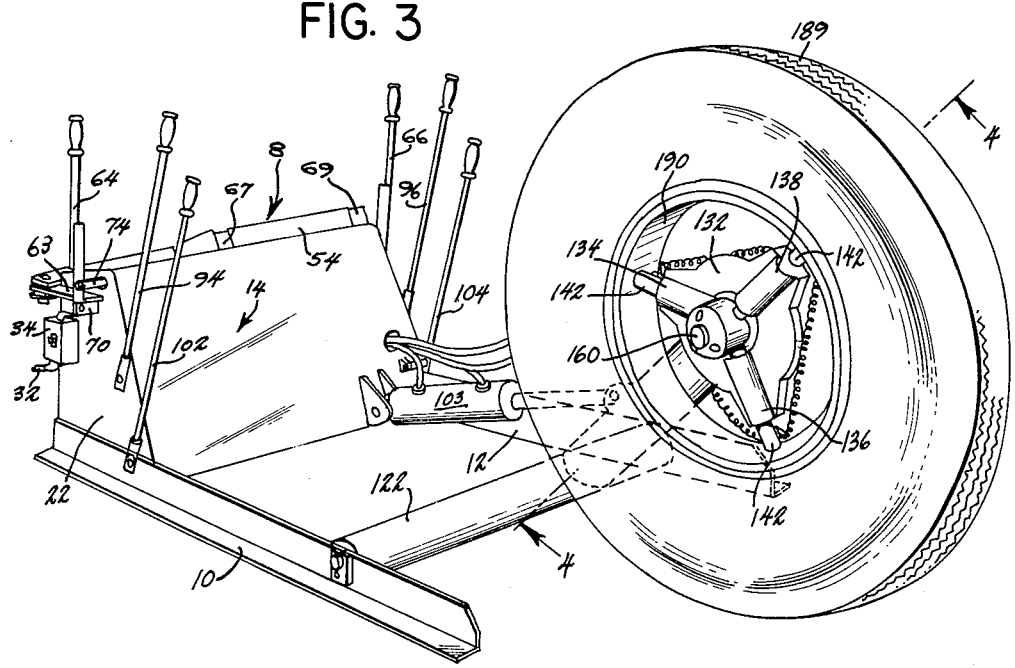
FIG. 3 is a perspective view of the apparatus of the FIGS. 1 and 2 showing the apparatus with a tire mounted on the chuck as it is positioned before being elevated to the operating position.

The boom 124 is first lowered by movement of either of the levers 94 or 96 in clockwise direction as viewed in FIG. 1, thereby causing the actuator 103 to be extended. When the boom is positioned approximately as shown in FIG. 3, the movement of the boom is halted. The chuck 132 is then turned manually so that one of the rim engaging members 142 is pointed downwardly. A wheel, such as a truck wheel 189 of FIG. 5 is then rolled to a position adjacent the chuck 132 with the lock ring side of the wheel on the opposite side of the chuck from the chuck support 130. The wheel is then tipped toward the chuck so that the rim thereof extends over the ends of the two upwardly directed rim engaging members 142. The rim flange 180, best seen in FIGS. 2 and 4, then abuts against the stops 148. By moving either of the levers 94 and 96 in the other direction, the actuator 103 is then caused to retract thereby moving the boom upwardly in a counter-clockwise direction as viewed in FIG. 1, a sufficient distance to lift the wheel from the floor so that the lower portion of the rim swings in against the stop 148 of the lower rim engaging member. The boom 124 is then lowered slowly by again moving one of the levers 94 and 96 in a clockwise direction as seen in FIG. 1 to produce a slight pressure between the rim and the lower rim engaging member.

The top of the tire is then held in place manually and one of the levers 102 or 104 is actuated causing the motor 114 to turn thereby turning the gear 164 and chuck drive screw 160 in a direction adapted to cause the spreader member 152 to move inwardly on the screw 160. The wheel engaging members 142 are thus driven outwardly to securely engage the rim 190. As soon as all of the members 142 are in contact with the rim, the motor 114 is stopped by moving the levers 102 and 104 to their original positions.

By again moving one of levers 94 and 96, the boom is elevated to a position at which the bead of the tire is aligned with the rim of the press wheel 193. One of the levers 66 or 64 is then moved laterally to the right in FIG. 2 so that the press wheel 193 takes the position shown in FIG. 2, the peripheral edge of the wheel 193 abutting against the bead 192 of the tire 189. In this way, the bead 192 is first loosened on the side of the rim 190 provided with the lock ring 191.

Next, one of levers 102 or 104 is actuated thereby causing the motor 114 to rotate in a counter-clockwise direction as seen in FIGS. 1 and 3 until the tire has made a complete revolution. The bead of the tire will then ordinarily be completely separated from the lock ring 191. If the bead is not completely released from the rim in the first revolution of the wheel, one of the carriage control levers 64 and 66 can be operated again to move the carriage 54 further to the right in FIG. 3. When the wheel continues to rotate pressure can be applied intermittently as required to obtain complete separation of the tire bead and rim.

When the bead has been loosened, the wheel rotation is stopped by moving the levers 102 and 104 to their original position. The lock ring 191 can then be removed in the conventional manner. The press wheel 193 is moved to the opposite side of the carriage 54 to the dotted line position of FIG. 5. After moving the press wheel to the dotted line position, the chuck and tire is again rotated and intermittently pressure is applied to the tire with the press wheel by moving one of the carriage control levers 64 or 66 to the left in FIG. 3. When the second bead has been loosened, tire rotation is stopped so that the valve stem (not shown) is directed downwardly. The valve stem is then pushed back into the tire. For final removal of the tire from the rim, the chuck is again rotated while the carriage and press wheel are slowly advanced to the left in FIG. 3 until the entire tire is pressed off the rim.

To remove the rim from the chuck, the boom 124 is lowered, the chuck stop pin 184 is inserted into one of the depressions 186 on the chuck 132. One of the wheel rotation control levers 102 or 104 is then moved to drive the motor 114 in the opposite direction described above for tightening the chuck thereby causing the member 152 to move to the left in FIG. 4 and allowing the rim engaging members to slide inwardly responsive to the tension of the spring 150.

Re-assembly or mounting of the tire upon the rim 190 is carried out in a conventional manner either on or off of the tire changer 8.

Demounting tires having drop center rims such as tire 200 of FIG. 6, will now be described. The tire 200 is mounted upon the chuck and casing is loosened from the rim 202 in the same manner as described hereinabove in connection with the tire 190. The press wheel 193 is then removed from the carriage and the carriage is returned to the starting position at the left of FIG. 3. A suitable mount and demount tool 204 of known construction is then connected to the carriage at the left of the tire as viewed in FIG. 3 by placing one end thereof in socket 67. The boom is then moved again to the operating position adjacent the tool 204. By means of a tire iron, a portion of the bead is lifted onto the tire engaging portion 205 of the tire tool 204. The chuck 132 and tire 200 are then rotated in the same manner as described hereinabove to demount tire 189. The valve stem (not shown) is then pushed back into the tire and the tube (not shown) is manually removed from the tire casing.

To mount the tire on a drop center rim such as rim 202, the wheel is first placed on the chuck as described hereinabove. The tube is inserted into the tire casing conventionally. The tire is then placed over the tool 204 so that the tool 204 extends through the opening in the center of the tire. The boom is then moved to position the rim flange 206 in the operating position adjacent the tool 204.

The chuck is then rotated to position the valve stem opening in the wheel 6 to 8 inches below the tool 204. The bead of the tire adjacent to the wheel before mounting (hereinafter referred to as the first bead) is then placed adjacent to the face of the tool 204. A pair of vice-grip pliers 208 of known construction are then attached to the rim flange 206 as shown in FIG. 6. The portion of the first bead of the tire adjacent to the portion over the end of the tool 204 is hooked beneath the pliers 208. The tire is then rotated in the same direction as for loosening beads. As this is done, the movement of the pliers with the wheel will lift the tire up into place. The lower portion of the tire is then pushed manually inward against the rim 202 to start the first or inward bead across the rim flange 206. The pliers 208 are removed when they have revolved to the position of the tool 204. The casing is then slid manually to position the valve stem (not shown) adjacent the stem opening in the rim. The second bead is then placed adjacent the end of tool 204 as shown in FIG. 6. To force the second bead of the tire onto the rim, the chuck and tire are rotated one revolution in a counter-clockwise direction as viewed in FIG. 3.

While a brief operating description has been given by way of example, further details of operation on the above described tires as well as other kinds of tires and rims, will be apparent to those skilled in the art.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A tire changer comprising in combination a frame, a generally upward extending boom having its lower end pivotally mounted on the frame for movement about a horizontal axis, a wheel chuck mounted at the free end of the said boom for rotation on an axis parallel to said horizontal axis, drive means mounted on the free end of the boom and connected to the chuck to rotate said wheel chuck upon said boom, a drive means connected to the boom to pivot said boom on said frame about said horizontal axis, tool support carriage mounted upon said frame for movement along a path parallel to said axis, and a tire tool mounted upon said tool support carriage for mounting or demounting a tire from a rim coaxially mounted on the chuck when said wheel chuck is thus caused to rotate.

2. An apparatus according to claim 1 wherein said carriage has a pair of said tire tools mounted thereon and spaced apart in a direction parallel to said path, and drive means operatively connected to the carriage to selectively move the carriage to any of a plurality of positions along said path for engagement of one of said tire tools with the bead on one side of the tire when the carriage is in one position and engagement of the other of said tire tools with the bead on the other side of the tire when the carriage is in another position.

References Cited by the Examiner
UNITED STATES PATENTS

| 1,538,875 | 5/25 | Stevens | 157—1.24 |
| 2,045,778 | 6/36 | Huntley et al. | 157—13 |
| 2,201,982 | 5/40 | Bazarek | 157—1.22 |
| 2,448,414 | 8/48 | Branick | 144—288.1 |
| 2,546,988 | 4/51 | Eberly | 157—1.24 |
| 2,767,781 | 10/56 | Lewis et al. | 157—1.24 |
| 2,783,830 | 3/57 | Pozeryeki et al. | 157—1.24 |
| 2,903,049 | 9/59 | Carlson | 144—288.1 X |
| 2,920,664 | 1/60 | Lomen et al. | 157—1.24 |
| 2,945,522 | 7/60 | Nelson | 144—288.1 |

FOREIGN PATENTS

| 161,851 | 3/55 | Australia. |

FRANK E. BAILEY, *Primary Examiner.*

WALTER A. SCHEEL, *Examiner.*